United States Patent
Bartelt-Berger et al.

(10) Patent No.: US 6,580,052 B1
(45) Date of Patent: Jun. 17, 2003

(54) METHOD FOR ASSEMBLING A MISER LASER WITH FIBRE COUPLING

(75) Inventors: Lars Bartelt-Berger, Oppenweiler (DE); Albrecht Kuke, Auenwald (DE); Raimund Fritscher, Burgstetten (DE); Helmut Reppe, Leinfelden-Echterdingen (DE); Werner Scholz, Weissach (DE); Ralpf Sommerfeldt, Backnang (DE)

(73) Assignee: Tesat SpaceCom GmbH KG, Backnang (DE)

( * ) Notice: Subject to any disclaimer, the term of this patent is extended or adjusted under 35 U.S.C. 154(b) by 0 days.

(21) Appl. No.: 09/890,555

(22) PCT Filed: Feb. 28, 2000

(86) PCT No.: PCT/DE00/00551
§ 371 (c)(1),
(2), (4) Date: Feb. 5, 2002

(87) PCT Pub. No.: WO00/52790
PCT Pub. Date: Sep. 8, 2000

(30) Foreign Application Priority Data

Feb. 27, 1999 (DE) .......................................... 199 08 599

(51) Int. Cl.[7] .............................................. B23K 26/42
(52) U.S. Cl. ................................................ 219/121.64
(58) Field of Search ......................... 219/121.64, 121.6, 219/121.63, 121.78, 121.79, 121.61; 250/559.29, 559.37

(56) References Cited

U.S. PATENT DOCUMENTS

| | | | |
|---|---|---|---|
| 4,749,842 A | | 6/1988 | Kane et al. |
| 5,027,367 A | | 6/1991 | Rea, Jr. et al. |
| 5,566,264 A | * | 10/1996 | Kuke et al. ................... 385/49 |
| 5,577,142 A | * | 11/1996 | Mueller-Fiedler et al. .... 385/47 |
| 5,600,741 A | * | 2/1997 | Hauer et al. ................... 385/35 |
| 5,696,862 A | * | 12/1997 | Hauer et al. ................... 385/88 |
| 5,898,803 A | * | 4/1999 | Mueller-Fiedler et al. .... 385/36 |
| 6,297,487 B1 | * | 10/2001 | Kuke et al. .............. 250/201.1 |

FOREIGN PATENT DOCUMENTS

EP  0 291 145  11/1988

OTHER PUBLICATIONS

Kane T. J., et al., "Monolithic, Unidirectional Single–Mode ND:YAG Ring Laser," Optics Letters, vol. 10, No. 2, 65 (1985).

Kane, T. J., et al., "Fast Frequency Tuning and Phase Locking of Diode–Pumped ND: YAG Ring Lasers," Optic Letters, vol. 13, No. 11, 970 (1988).

* cited by examiner

Primary Examiner—Tom Dunn
Assistant Examiner—Jonathan Johnson
(74) Attorney, Agent, or Firm—Kenyon & Kenyon

(57) ABSTRACT

Mounting method for a miser laser having a miser crystal on the base surface of a housing, which has a side wall with a housing window for the miser exit beam, is provided. A reference beam is directed through the housing window on to the crystal end face of the miser crystal with an inverted light beam direction which the miser beam to be generated is later to have. An adjusting device which permits mutually independent movements, on the one hand in a direction parallel to the reference beam, and on the other hand perpendicular thereto and parallel to the housing base, and also permits rotations about an axis of rotation perpendicular to the housing base, is used to preadjust the premounted miser stack such that the angle between the surface normal of the crystal end face and the reference beam is approximately 45°, and the reference beam strikes the crystal end face approximately at its center. In the as yet not optimally adjusted case, all the reflections are united on a display screen by displacing the miser transverse to the direction of the reference beam and by rotation.

6 Claims, 5 Drawing Sheets

METHOD FOR ASSEMBLING A MISER LASER WITH FIBRE COUPLING

FIELD OF THE INVENTION

The invention relates to a mounting method for assembling a miser laser with fiber coupling.

BACKGROUND INFORMATION

A miser laser with fiber coupling miser may be required, for example, for optical telecommunications engineering with coherent transmission, since this requires an extremely narrowband and phase-stable signal light source. According to the prior art optical modulators with transverse single-mode and polarization-dependent optical fibers are used to modulate the light. Consequently, the light generated by the miser may need to be coupled into a polarization-maintaining single-mode fiber. Moreover, in the case of free-beam transmission between satellites, there may still be a need for optical amplification of the modulated signal in a single-mode fiber amplifier.

The method of functioning of a miser (MISER= Monolithic Isolated Single-mode End-pumped Ring resonator) has been discussed, for example, in the publications by Thomas J. Kane and Robert L. Byer "Monolithic, unidirectional single-mode ND:YAG ring laser", Optics Letters, Vol. 10, No. 2, 65 (1985) and Thomas J. Kane, Emily A. P. Cheng, "Fast frequency tuning and phase locking of diode-pumped ND:YAG ring lasers", Optics Letters, Vol. 13, No. 11, 970 (1988). By contrast with a laser having a rod-shaped laser crystal and two end mirrors, in a ring laser the light is guided on an annular light path via a plurality of deflecting mirrors. In this case, both senses of circulation are possible for the light.

In a miser laser, the light is guided inside a monolithic laser crystal on a non-planar annularly closed light path. The light guidance is performed by a plurality of total reflections at the crystal faces and by partial reflection at a light exit and entry surface, which has a high reflectivity for the laser light. The pumping light is launched longitudinally, that is to say in the beam direction of the laser light by the same partially reflecting surface from which the laser light exits. Consequently, this surface may need to be dichroically coated and have a low reflectivity for the pumping light and a high reflectivity for the laser light.

By comparison with arrangements with separately assembled mirrors, the monolithic integration of all the reflecting mirrors as bounding faces of a single crystal produces a substantially more robust beam guidance. A miser laser is distinguished by a laser exit beam which is a single-mode beam in longitudinal and transverse terms. In order to achieve a stable longitudinal single-mode characteristic, standing waves may need to be avoided in the amplifying range of the laser, since, because of what is termed a spatial-whole-burning effect in the region of the antinodes of a standing wave, inversion there may preferably be reduced. In the middle region of the resonator, however, the next higher or lower longitudinal mode of a laser has its nodes at these points, and so their excitation may be preferred, which may lead to uncontrolled jumping between adjacent longitudinal modes, and thus to frequency instability.

In order to avoid standing waves in the amplifying range of the laser, it may be necessary to suppress one sense of circulation in the case of an annular light path. This is done in the case of a miser by superimposing a reversible and an irreversible rotation of the plane of polarization of the light. The reversible rotation of the plane of polarization is performed in the case of the miser by virtue of the fact that the light path is not guided in a plane. In this case, the light tracks at least three reflecting surfaces whose normal directions do not lie in a plane. This leads to a rotation of the direction of polarization of the light with reference to the light propagation direction which has an opposite direction for the two annularly guided light paths in accordance with their sense of circulation.

A material exhibiting a Faraday effect such as, a Nd-doped YAG crystal, is used for the miser laser in order to generate the superimposed irreversible rotation of the polarization direction. For this purpose, a magnetic field is applied parallel to the longitudinal axis of the YAG crystal.

The effect of superimposition of the two effects in relation to reversible and irreversible rotation of polarization is that the two rotational effects are amplified for one direction of circulation of the light, and weakened for the other direction of circulation. Given a suitable strength of the magnetic field, when striking the light exit surface, the light of one direction of circulation therefore strikes virtually at right angles to and, in the other direction of circulation, virtually parallel to the plane of incidence. This results in a different reflection and transmission response for the two directions of circulation and, as a consequence thereof, a different degree of damping. Consequently, only the light wave with the direction of circulation in the direction with the minor damping obtains laser operation. Standing waves are thereby avoided and a longitudinal single-mode operation is rendered possible.

The transverse single-mode characteristic is achieved by means of a longitudinal pumping light excitation via the light entry surface, the cross section of the pumping light beam being limited such that possibly only the volume of the transverse fundamental mode is excited. The tuning of the frequency of the laser light can be performed by temperature control of the laser crystal with the aid of a relatively large time constant and a relatively large frequency deviation and, additionally, by means of mechanical bracing via an adhesively attached piezoelectric element with a smaller time constant in the millisecond range and a smaller frequency deviation.

A mounting and assembling concept for a miser is proposed in U.S. Pat. No. 4,749,842 dated Jun. 7, 1988, the light source for the pumping light being integrated in the same housing as the miser crystal. The laser beam from the miser exits as a collimated beam from a window in the housing wall.

Stable launching of the light into a polarization-maintaining single-mode fiber may be required for the above-described application of a coherent optical message transmission. The difficulty may arise here that both the beam path for the pumping light and the beam path for launching the laser light into the polarization-maintaining single-mode fiber may need to be aligned with high accuracy in relation to the laser crystal.

A further difficulty may arise because retro-reflections of the output beam back into the laser crystal may need to be avoided in order not to endanger the frequency stability of the miser. In the previous solution, the laser crystal is adjusted in a plurality of degrees of freedom in relation to the incident pumping light beam, and fixed by soldering. In this adjustment, the ideal pumping light launching site may need to be struck on the light entry and light exit surface on the laser end face within a small region, with a diameter of a few tens of micrometers, at the correct angle since it is only starting from this launching site that an inherently closed light path is possible and a laser beam can be excited. According to the prior art cited above, the laser crystal may be adjusted in relation to the focused pumping light beam in three translation coordinates and two angular coordinates until a laser beam of optimal power emerges from the crystal. The direction and position of the exiting laser beam depends on the position of the laser crystal after the adjustment, and is therefore undetermined. As a consequence of tolerances in the dimensions and cut angles of the crystal, this can result in a substantial uncertainty in the direction and position of the laser beam.

In order to focus the laser beam onto a polarization-maintaining single-mode fiber for applications to coherent transmission technology, there may be a need for a focusing lens which may need to be positioned in the beam path. This lens cannot be fitted directly at the exit window of the laser crystal since optical delay plates may also be required for setting the state of polarization between the laser crystal and focusing lens. In an adjusting and assembling concept, according to the prior art, coupling a single-mode fiber would be very problematic, since the adjusting operation of the laser output depends on the adjusting operation at the pumping light input and the uncertainty, caused thereby, in the position of the laser beam.

SUMMARY OF THE INVENTION

The present invention proposes an assembling and adjusting concept which avoids the above-described disadvantages and permits the pumping light input and the laser output to be coupled stably and with low retro-reflection into a polarization-maintaining single-mode fiber, the adjusting processes at the pumping light input and at the laser output being independent of one another.

DETAILED DESCRIPTION

Figure 1:
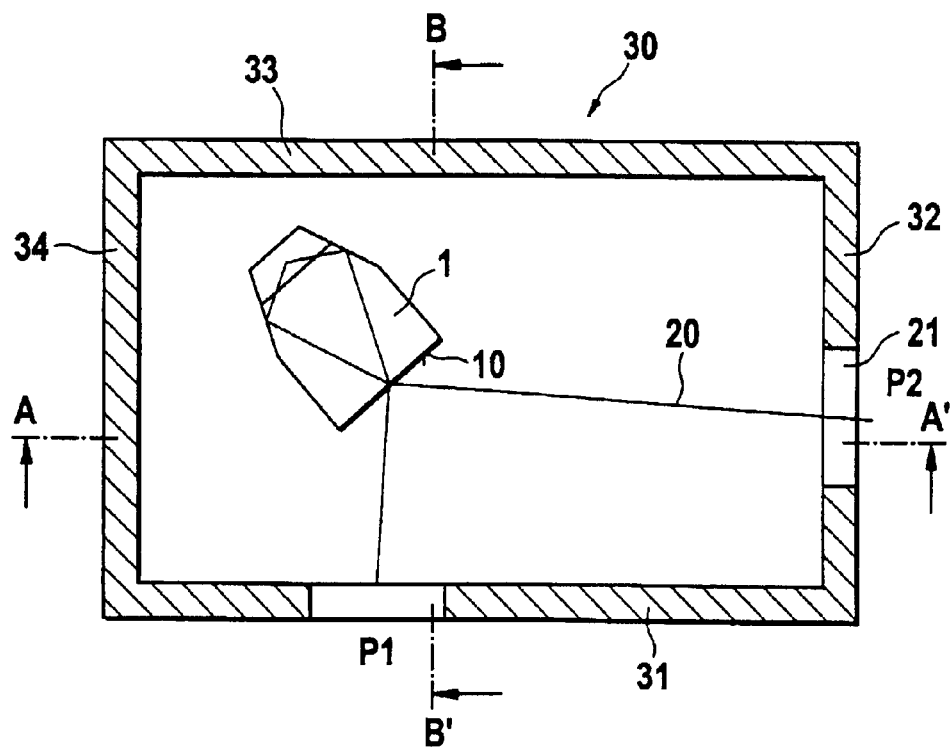
FIG. 1 shows a miser laser without a coupling optical system for the input and output, in a plan view.

A miser crystal 1 is seated on a temperature controlled heating element 2 and a temperature insulation block 3. The temperature control of the miser crystal is used to tune the optical wavelength of the miser. A piezoelectric element 4 fastened on the top side of the miser crystal serves for fine tuning of the optical wavelength with a high control rate. This piezoelectric element 4 has been omitted in the plan view in FIG. 1 for reasons of clarity. Two permanent magnets, which may preferably be fitted in the cover of a housing 30 and project as far as just above the miser crystal, generate the static magnetic field required for the Faraday effect in the miser crystal. The entire miser stack 5, which comprises the parts 1 to 4, is firstly mounted, and the individual parts are fastened to one another by means of bonding or soldering. An objective of an exemplary embodiment of the present invention is now to adjust this miser stack 5 inside the housing 30 with the side faces 31 to 34 and the housing base 35, and to fix it on the housing base 35. The purpose of this adjustment of the miser stack is to predetermine the direction and position of the pumping beam entering in the port P1 and of the miser beam exiting from the port P2. In accordance with a feature of an exemplary embodiment of the present invention, a reference beam 20 is directed through the port P2 from outside in order to adjust the miser beam. This reference beam 20 has approximately the same wavelength, the same position and the same spatial angular alignment, but with a light beam direction inverted with respect to the direction of the miser beam that will be generated later in the miser crystal.

The fibers to be coupled may need to have sloping end faces in order to avoid retro-reflections. An angle of 8° between the normal of the fiber end face and the fiber axis is customary for single-mode fibers in optical telecommunications engineering. According to the law of refraction, the exiting beam is then refracted by 3.7° with reference to the fiber axis. To simplify the mounting, it may be advantageous when the fiber axis of an output fiber to be coupled runs in the direction of the surface normal on the side surface 32 of the housing. The miser exit beam may need to then enclose an angle of 3.7° with reference to the surface normal to the side surface 32. Consequently, the reference beam 20 is aligned such that it runs parallel to the base surface 35 of the housing 30 and encloses an angle of 3.70° with the surface normal to the side surface 32.

A lens is later inserted into the first housing window 21 at the output port P2 in order to focus the miser exit beam onto the end face of the output fiber. Since this lens may need to be struck by the miser beam, to be generated later, as near as possible to the center thereof, the position of the reference beam is aligned such that it traverses the center of the housing window 21 at the port P2. To generate the reference beam 20, it is possible to use a collimator which comprises a singlemode fiber which has the same chamfer of the fiber end face as the output fiber later to be coupled; in addition, it is possible to use a collimation lens which is adjusted to this fiber and is seated in a flange which can be plugged with an accurate fit into the housing window 21 and oriented there in azimuthal direction such that the collimated reference beam runs parallel to the base surface 35 of the housing 30. Any other manner of generating the reference beam 20 such as, for example, by using a ND:YAG laser which is fastened in a common holder together with the miser housing 30 would be possible.

In the case of a miser, the pumping light beam and the miser beam may need to be guided collinearly or anticollinearly in the interior of the miser crystal. If this is not the case, either no miser light is excited or the miser light is not transversely single-modal or not experiencing optimal power excitation. Miser crystals are typically ground such that the pumping light beam and the miser beam enclose an angle of approximately 90° to one another, when they enter or exit via the light entry and light exit surface at the crystal end face 10. The plane of incidence of the entering and exiting beams is situated approximately parallel to the crystal base face and flows approximately through the center of the crystal end face 10. As a consequence of tolerances during grinding and polishing of the light-reflecting faces of the miser crystal, deviations can occur in the beam directions, in the position of the plane of incidence and in the position of the optimal launching point O (FIG. 4) for launching the pumping light into the crystal. This optimal launching point can be a few tens of micrometers distant from the center of the surface of the crystal end face, and the angular errors can be in the range of up to 2°. The mounting method according to an exemplary embodiment of the present invention for the miser stack renders it possible to carry out mutually independent adjustments in both ports P1 and P2 in a simple manner despite these crystal tolerances.

Figure 4:
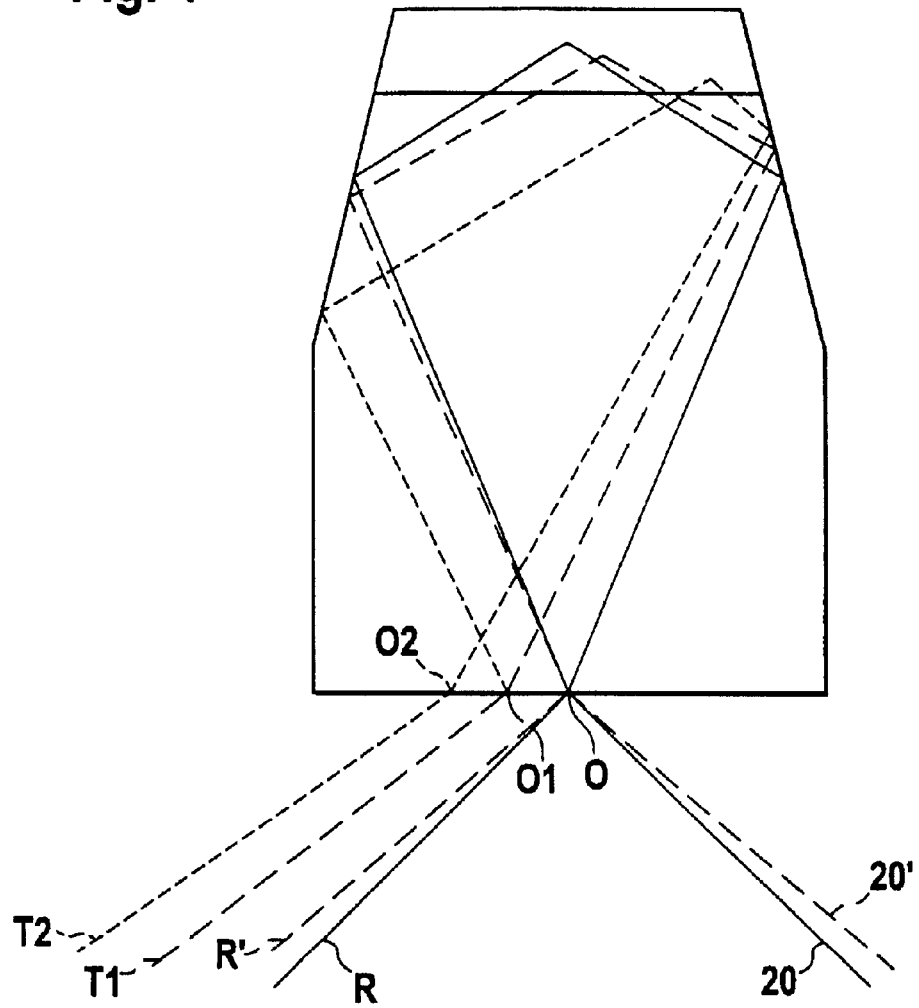
FIG. 4 shows a miser crystal for explaining possible beam profiles.

The adjusting method for the miser stack which may be required within the scope of the mounting method according to an exemplary embodiment of the present invention is explained within FIG. 4. Here, the beam path of the reference beam 20 is illustrated outside and inside the miser crystal (solid light path for optimal beam alignment). The adjusting method for the miser stack is based on the realization that in the event of optimal coupling of the pumping beam the light path of the latter in the interior of the miser crystal may need to run collinearly with the light path of the miser beam. So that the laser effect can be facilitated, the miser beam may need to run on an inherently closed annular path inside the crystal. It follows from this that the same point O on the crystal end face 10 may need to be struck at the same angle of incidence during all circulations of the miser light beam or the reference light beam 20, given optimal alignment of the miser crystal. Since the end face 10 is partially silvered, during each circulation of the miser light beam in the crystal a portion of the light exits at this point from the end face of the crystal, and the remainder is reflected and remains in the crystal for further circulations.

By directing the reference beam 20 onto this point O on the end face 10 at the directional angle at which the miser beam would exit were it optimally excited, the reference beam 20 is guided in the miser crystal on a closed annular light path in the opposite sense of circulation to that of the miser beam to be generated, a fraction of the reference beam 20 exiting with each circulation upon striking the end face 10 in the direction from which a pumping light beam would have to enter given optimal launching. Also reflected in this direction is the component of the reference beam 20 which does not enter the crystal upon striking the end face 10 at the point O.

If the reference beam does not enter precisely at the optimum striking point O, but somewhat to the side thereof (lateral maladjustment), or—as illustrated in FIG. 4 by the dashed line 20' (angular maladjustment)—it does not come from the ideal direction, or if both lateral maladjustment and angular maladjustment occur, no closed annular light path is produced in the interior of the miser crystal for the light fraction of the reference beam which enters the miser crystal. The result of this is that with each circulation of light it is not the point O in the end face 10 which is struck, but in each case different points O1, O2, O3, . . .

Each time these points are struck, a fraction of the circulating reference beam exits the end face as partial beams T1, T2, T3, . . . These various n partial beams differ from one another not only in their exit points O1, . . . , On, but also in their beam direction. All these beam directions of the partial beams exiting from the miser crystal also differ in beam direction and beam output point from the reference beam R reflected at the end face 10 at the striking point O.

If the partial beams T1 to Tn and the reflected reference beam are intercepted by a screen or in a camera without an objective, in the event of maladjustment of the miser crystal with reference to the incident reference beam 20, a bright spot is seen as image of the reflected reference beam R, as are two to three weaker images of the partial beams T1, T2 and T3 from the first circulations of the reference beam in the crystal interior. The various reflections can be brought together to form a single reflection by lateral movement of the crystal and by rotation about a vertical axis. The reflected reference beam R and all the partial beams T1, . . . , Tn traversing the crystal may need to be collinear for optimal adjustment of the miser crystal relative to the incident reference beam.

The coincidence of these beams at a single point on an observing screen or on a receiving chip of a camera is, however, still not a sufficient condition for the required collinearity, since the beams can also exit from different points O1, . . . , On in the crystal end face 10, and can coincide before reaching the screen or the camera. In order to demonstrate the required collinearity of the beams R and T1, . . . , Tn, these beams may need to respectively coincide in two planes situated one behind another. This can be demonstrated either by an axial displacement of the screen or the camera in the beam direction or by a diaphragm stop in the vicinity of the crystal exit surface and a camera or a screen at a larger spacing.

Figure 2:
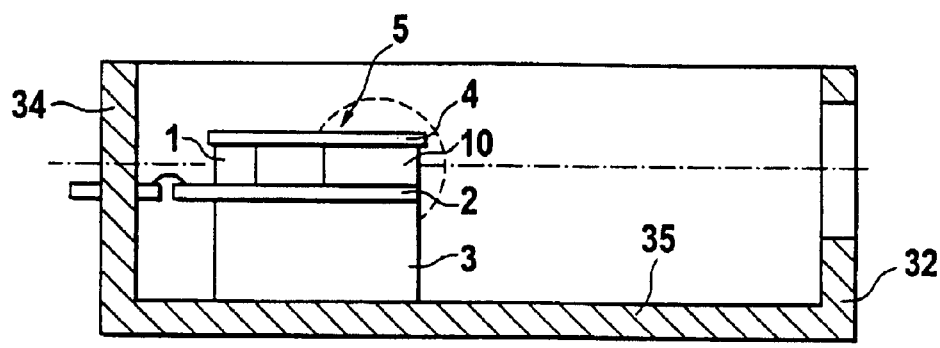
FIG. 2 shows a section AA', viewed from the side of the pumping light entry.
Figure 3:
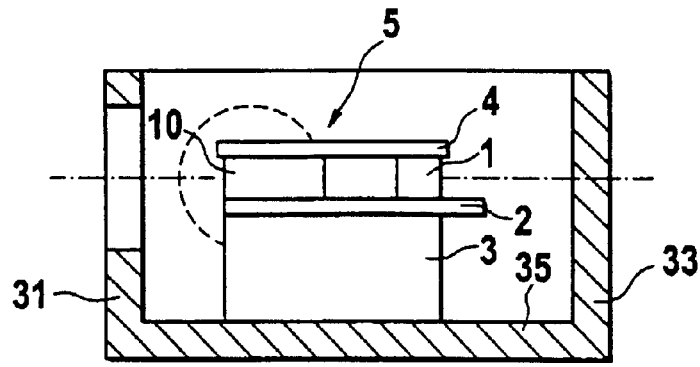
FIG. 3 shows a section BB', viewed from the side of the laser light output.
Figure 5:
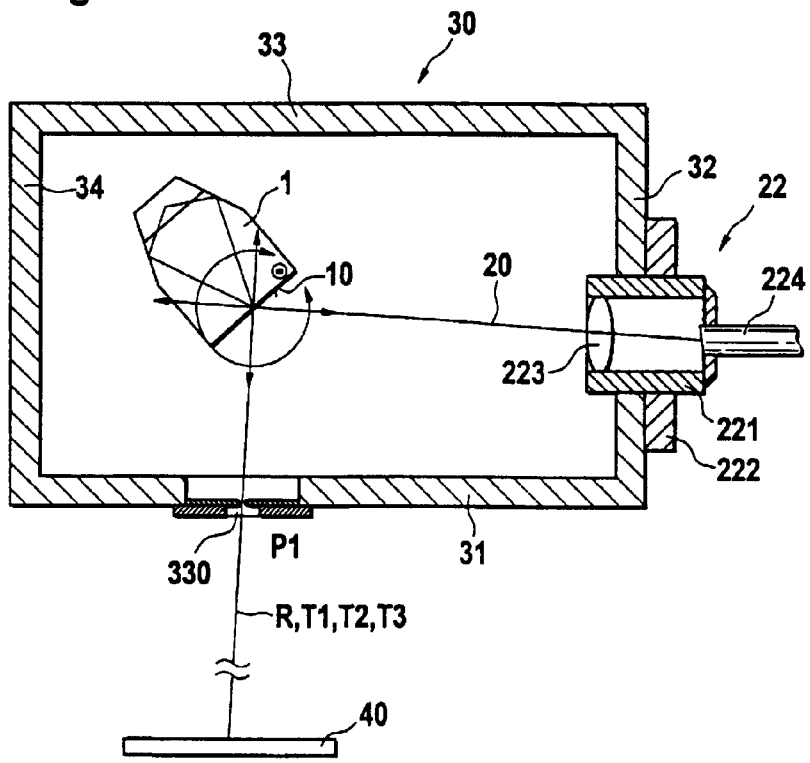
FIG. 5 shows an arrangement for explaining an adjusting strategy for a miser stack.

FIG. 5 relates to a preferred strategy for adjusting the miser stack. A collimator 22 is plugged into the housing window 21 of a port P2 (compare FIG. 1) in order to generate the reference beam 20. This collimator 22 comprises a housing 221, with the aid of which it is held in an accurate fit in the housing window 21, and a flange part 222, which rests against the outside of the wall 32 in order to ensure accurate angular alignment of the collimator 22 relative to the miser housing 30. The collimator contains a lens 223 and a fiber ferrule 224 with an end face which is polished with an inclination of 8° and lies in the focal plane of the lens 223. The ferrule axis is aligned in the direction of the surface normal to the wall 32. As a consequence of the refraction of light at the inclined end face of the fiber ferrule, the light beam exits at an angle of 3.7° relative to the surface normal to the wall 32. The ferrule 224 is offset with respect to the center of the lens 223 such that the collimated beam 20 enters the interior of the miser housing 30 at an angle of 3.7° with respect to the surface normal to the wall 32. The azimuthal alignment of the collimator is set via stops or adjusting marks such that the beam 20 runs parallel to the housing base 35 (compare FIG. 2) of the housing 30.

The premounted miser stack 5 (FIG. 2) can be displaced in the x, y and z directions via an adjusting device and rotated about the z axis by an angle of Θ. The x axis runs in this case parallel to the reference beam 20, and the y axis runs perpendicular thereto and parallel to the housing base 35 while the axis of rotation is perpendicular to the housing base. By suitable selection of the thicknesses of its components, the miser stack 5 is structured in such a manner that the center of the miser end face 10 coincides at least approximately with the level of the reference beam 20. The z adjustment serves the purpose of introducing the miser stack into the housing and in order to raise it a few micrometers during adjustment, and thus to avoid friction during the adjusting movements. The angle Θ between the surface normal to the crystal end face 10 and the reference beam 20 is set to approximately 45°, and the coordinate y is selected such that the reference beam 20 strikes the crystal end face 10 approximately at the center.

In this initial position for the crystal adjustment, a portion of the reference beam 20 is deflected at the crystal end face 10 into the reflected beam R in the direction of the port P1.

The other portion of the reference beam 20 enters the crystal and leaves the crystal after one or more circulations as partial beams T1, T2, ... (FIG. 4) in directions close to the direction of the reflected beam R. The beams R and T1, T2, ... are intercepted by a screen 40 downstream of the port P1 which is provided with a diaphragm stop 330. Instead of the screen 40, the receiving chip of a CCD camera can be used, and the light spots R and T1, T2, can be represented on a monitor display screen.

Figure 6:
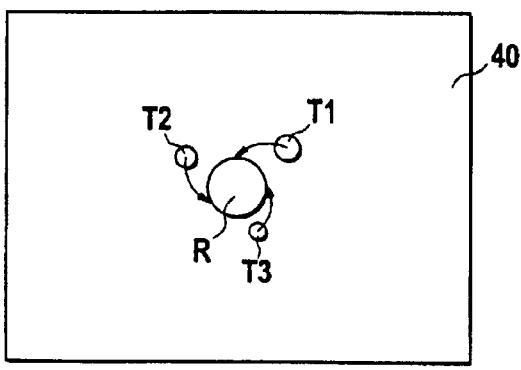
FIG. 6 shows a reflex image occurring during adjustment.

In the as yet not optimally adjusted case, a reflex image will result as illustrated in FIG. 6. By displacing the crystal in the y direction and by rotating in the Θ direction, the reflections T1, T2, ..., Tn can be united on the display screen with the reflection R such that only one common reflection remains visible. By displacing the miser stack in the x direction, all the reflections meet through the diaphragm stop 330 and thus the condition of collinearity in the xy plane is fulfilled.

After the adjustment, the miser stack is lowered onto the housing base and fixed by a conventional method, such as bonding or soldering. Since the lowering amounts to only a few micrometers, it may not cause any significant change to the adjustment. By contrast with the adjusting method of the prior art, here there is a plane-parallel mounting gap of small and defined width which permits fixing that is stable and has little warpage.

The miser crystal would have to be raised and/or tilted to adjust perpendicular angular errors. However, this is problematic during subsequent fixing, since it may then be necessary for an adjusting gap of a thickness not known in advance, between the miser stack and the housing base, to be filled by the fixing means. Experience shows that such a mode of procedure, which is also used in the above cited mounting concept of the prior art, leads to stability problems as a consequence of unpredictable thermal expansions and of creeping behavior of the fixing means. For this reason, the mounting concept according to an exemplary embodiment of the present invention avoids raising and tilting the miser stack 5 except for the abovementioned slight raising for the purpose of nonfrictional adjusting movement.

Figure 7:
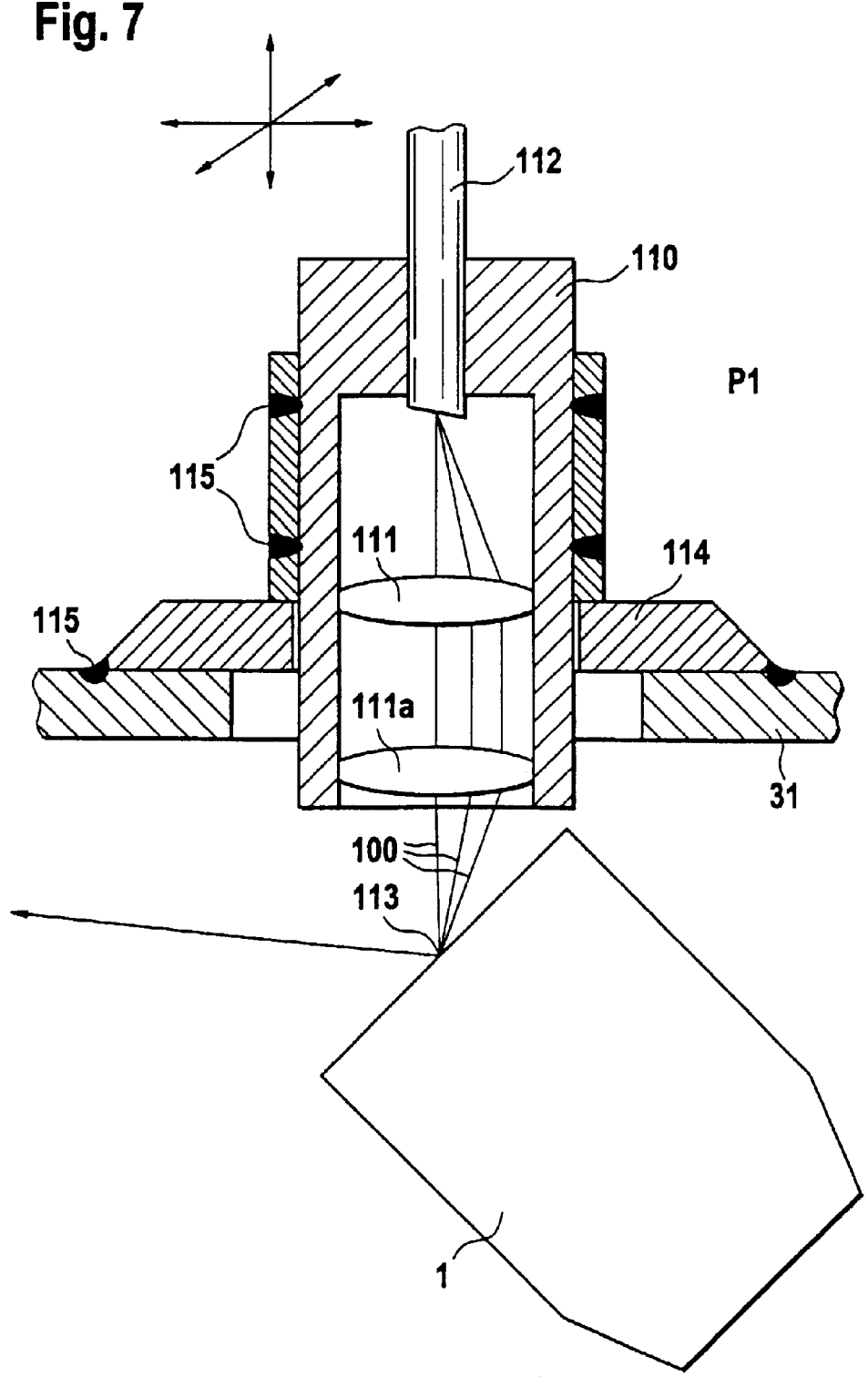
FIG. 7 shows an arrangement for explaining the adjustment of a ferrule for the pumping light of a miser.

The lateral and axial tolerances and the angular tolerances may be less critical in the case of the input port P1 for the pumping light (see FIG. 7) than in the case of the output port P2. Here, use is made of a lens tube 110 with lenses 111 and 111a which has been preadjusted in advance to a multimode pumping light fiber 112 and coupled in such a manner that the beam waist 113 of the focused pumping beam 100 is produced at a predetermined spacing and with a predetermined direction of 3.7° with reference to the surface normal to the housing side wall 31. The lens tube can then be guided in a fashion favorable for mounting in the direction of the surface normal to the side wall 31 and can be adjusted axially and laterally such that the miser 1 is optimally excited.

The fixing of the lens tube with the coupled pumping fiber may preferably be performed, as known in the prior art, by laser welding (laser weld points 115), a flange ring 114 which can be displaced in the axial and lateral directions permitting self-closure between the lens tube 110 and housing wall 31.

Figure 8:
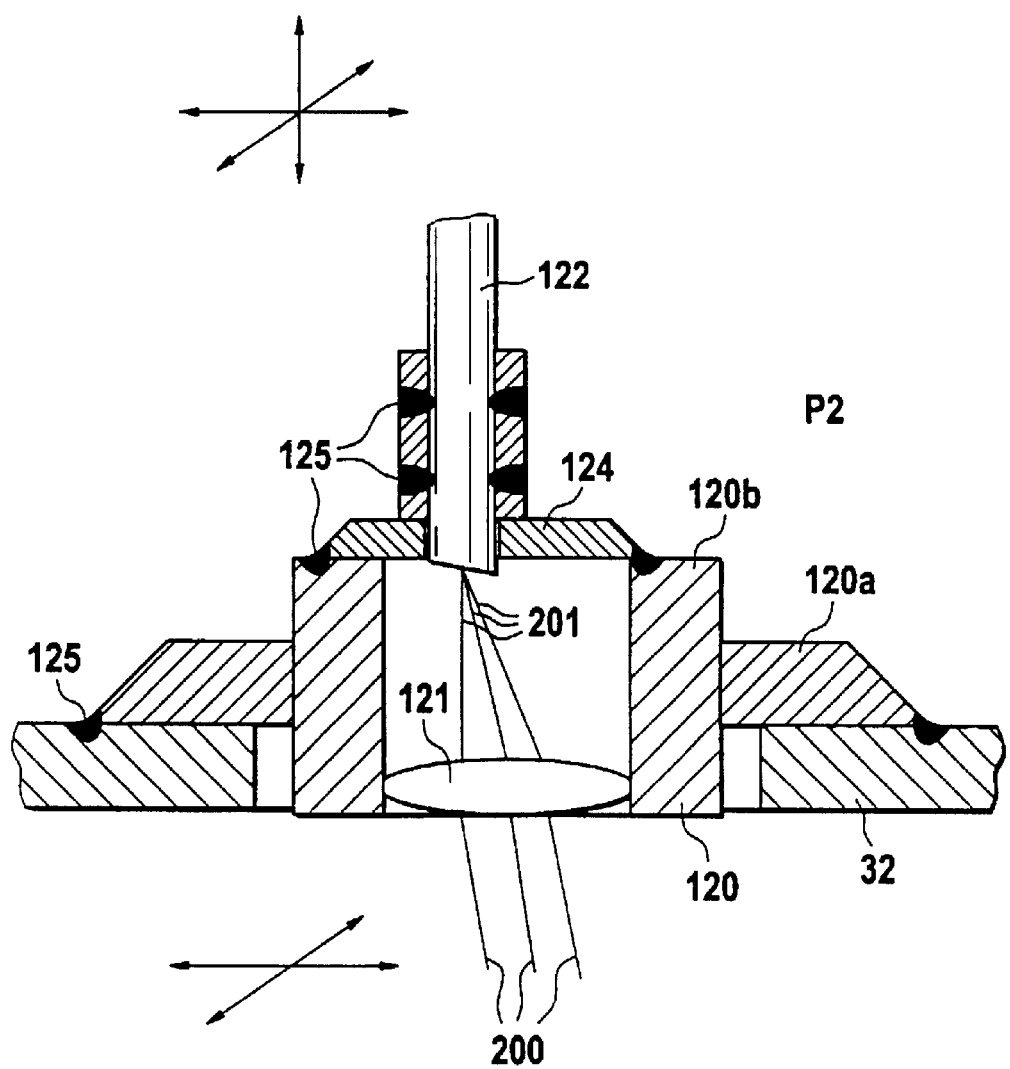
FIG. 8 shows an arrangement for explaining the vertical adjustment of a ferrule for the output light of a miser.

The vertical annular adjustment of the beam direction relative to the polarization-maintaining single-mode output fiber 122 mounted in a fiber ferrule (see FIG. 8) is performed by adjusting a focusing lens 121 in the output port P2 in a fashion which is lateral relative to the miser exit beam 200, the focused beam 201 being aligned in this manner in the optimal direction of acceptance with the output fiber 122. After the adjustment, the lens 121 may preferably be fixed on the housing wall 32 by laser welding (laser weld points 125). For this purpose, the lens is held in a mount 120 provided with a laser-weldable flange 120a. Thereafter, the fiber 122 mounted in a fiber ferrule is adjusted axially and laterally relative to the focus of the miser output beam and fixed on the top side 120b of the lens mount 120. The fixing may preferably be performed by laser welding (laser weld points 125) as in the port P1, here, again, a flange ring 124 which can be displaced in the axial and lateral directions permitting self-closure between the ferrule and the top side of the lens mount.

What is claimed is:

1. A mounting method for assembling a miser laser including a miser crystal in a miser stack, comprising:
    arranging the miser laser on a base surface of a housing, the housing including a side wall with a first housing window for allowing a miser beam to exit;
    directing from outside the housing a reference beam through the first housing window onto a first surface on a crystal end face of the miser crystal, the first surface being for light entry and light exit, the reference beam having approximately same wavelength, position, and spatial angular alignment as a miser beam to be generated later in the miser crystal, a direction of travel of the reference beam being opposite to a direction of travel of the miser beam to be generated later, the reference beam being aligned to travel parallel to the base surface of the housing and enclosing an angle of about 3.7 degrees with respect to a normal of the side wall having the first housing window;
    preadjusting the miser stack before mounting so that an angle between a normal of the crystal end face and the reference beam is approximately 45 degrees, the preadjusting being performed so that the reference beam strikes the crystal end face approximately at a center of the crystal end face, the preadjusting being performed using an adjusting device which permits a plurality of mutually independent movements, a first independent movement being in a direction parallel to the reference beam, a second independent movement being in a direction perpendicular to the reference beam and parallel to the housing base, and a third independent movement being a rotation about an axis of rotation perpendicular to the base surface of the housing;
    uniting on one of a display screen and a light-sensitive chip a plurality of reflected beams from the crystal end face by at least one of displacing the miser stack transverse to the direction of the reference beam and rotating, whereby a common reflection is formed;
    displacing the miser stack in the direction of the reference beam so that the plurality of reflected beams converge through a diaphragm stop and a condition of collinearity in a plane parallel to the base surface in the housing is fulfilled; and
    fixing the miser stack on the housing base.

2. The mounting method of claim 1, further comprising:
    providing in a second housing window a pumping light of a lens tube, the lens tube being pre-adjusted to a multimode pumping light fiber and being coupled to the center of the crystal end face so that a beam waist of a focused pumping beam is produced at a predetermined spacing and with a predetermined angle of 3.7 degrees with respect to a normal of a further side wall of the housing, the further sidewall including the second housing window.

3. The mounting method of claim 2, further comprising:

guiding the lens tube in a direction of the normal of the further side wall; and adjusting the lens tube at least one of axially and laterally to such that the miser crystal is optimally excited.

4. The mounting method of claim 2, further comprising:

fixing the lens tube with a coupled pumping fiber by laser welding, wherein a flange ring displaceable in an axial direction and a lateral direction provides closure between the lens tube and the further side wall of the housing.

5. The mounting method of claim 1, further comprising:

performing a vertical angular adjustment of a miser beam direction relative to a polarization-maintaining single-mode output fiber mounted in a fiber ferrule so that a focusing lens is adjusted in the first housing window laterally relative to the miser beam, whereby a focused beam is aligned in an optimal acceptance direction with the polarization-maintaining single-mode output fiber; and fixing the focusing lens on the side wall of the housing.

6. The mounting method of claim 5, further comprising:

holding the focusing lens in a mount provided with a flange;

adjusting the polarization-maintaining single-mode output fiber mounted in the fiber ferrule axially and laterally relative to a focus of the miser beam; and fixing the polarization-maintaining single-mode output fiber on a second surface of the lens mount.

* * * * *